Dec. 10, 1968   P. W. TILLISCH ETAL   3,415,026
BUILDING OF GYPSUM STRUCTURAL WALL ELEMENTS
Filed Oct. 23, 1965   5 Sheets-Sheet 5
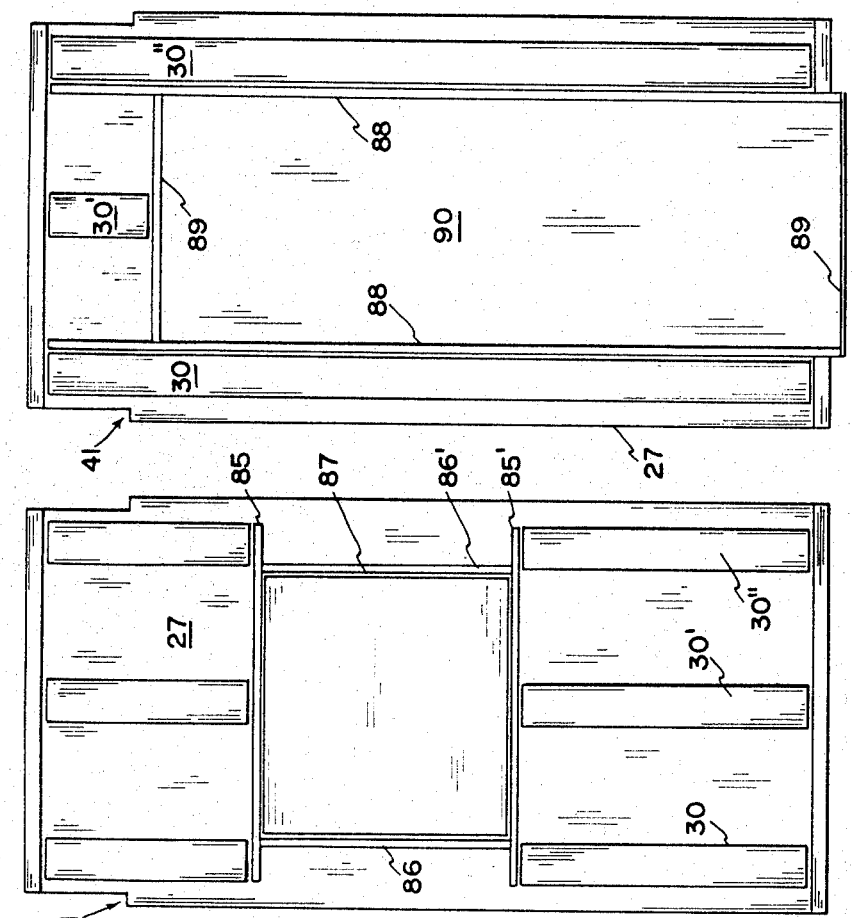
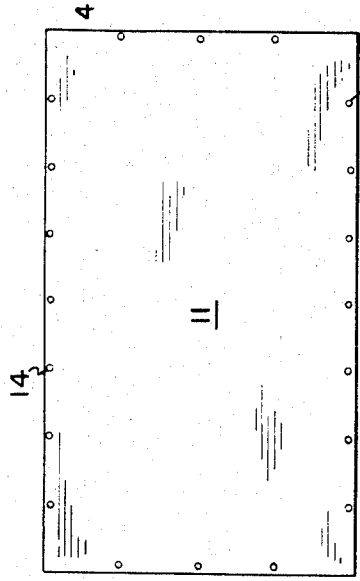
INVENTORS
PAUL W. TILLISCH
GEORGE E. MEYER
ROBERT R. CHIFFOLEAU
ROCCO PAPALIA
BY
ATTORNEY United States Patent Office 3,415,026
Patented Dec. 10, 1968

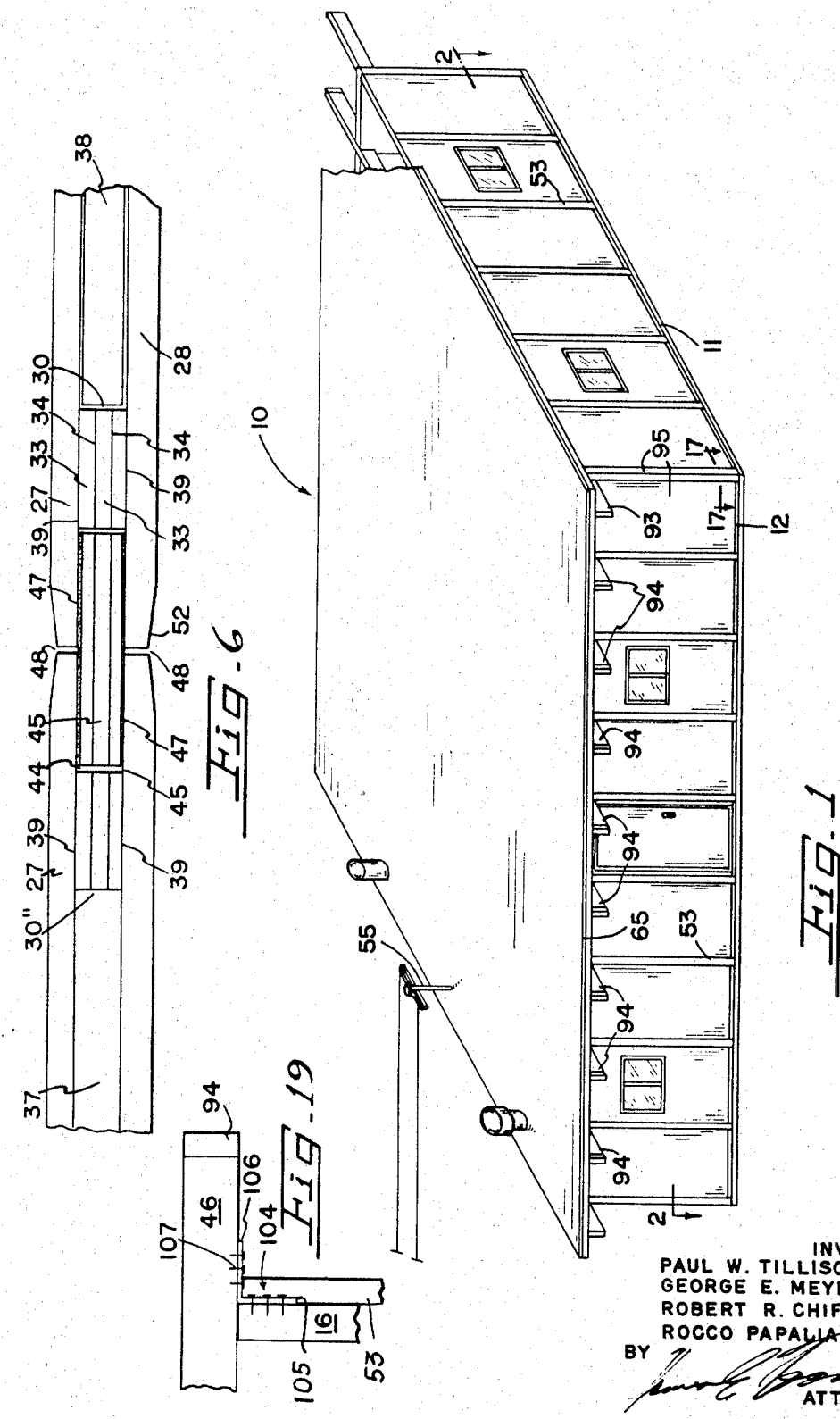

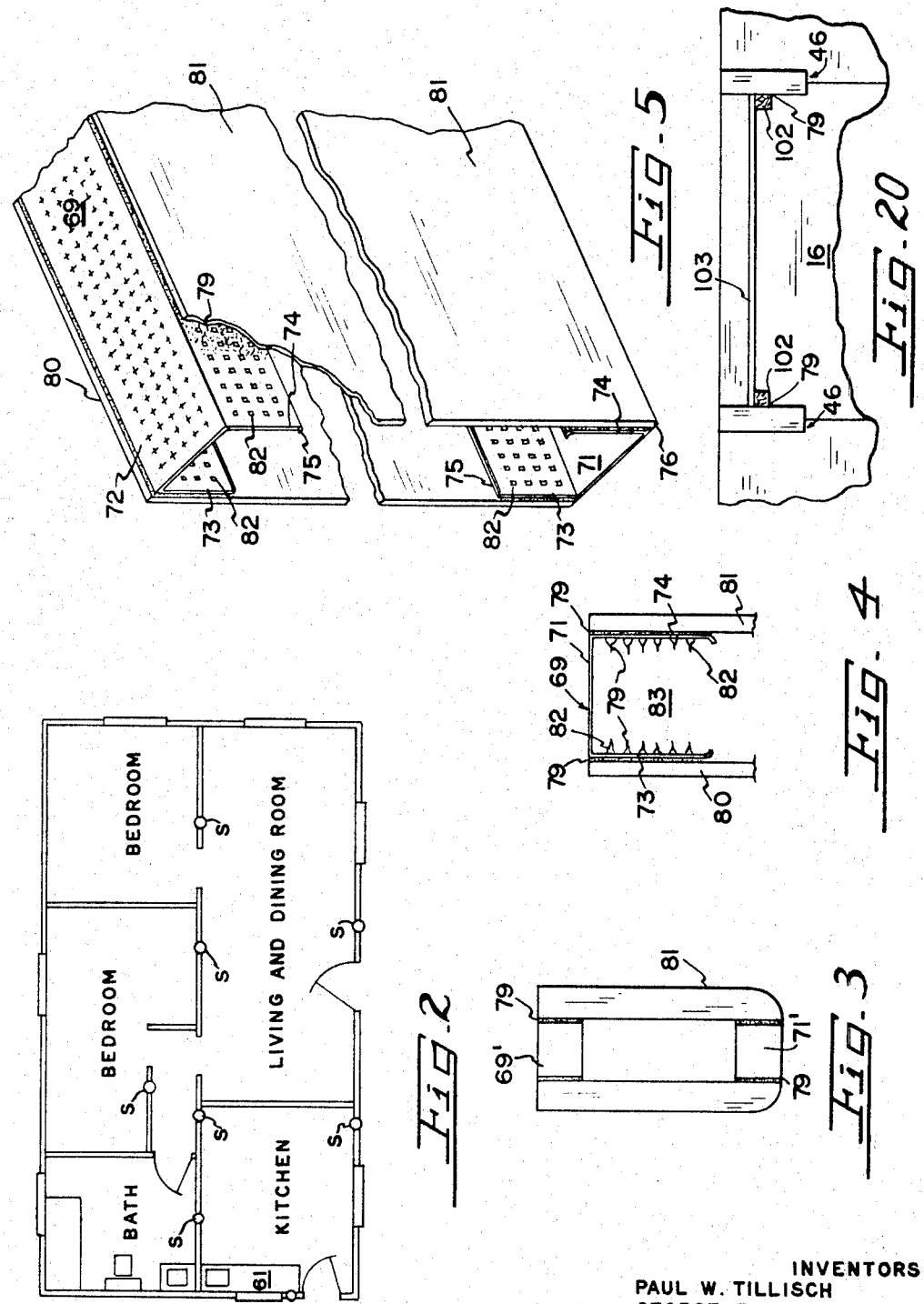

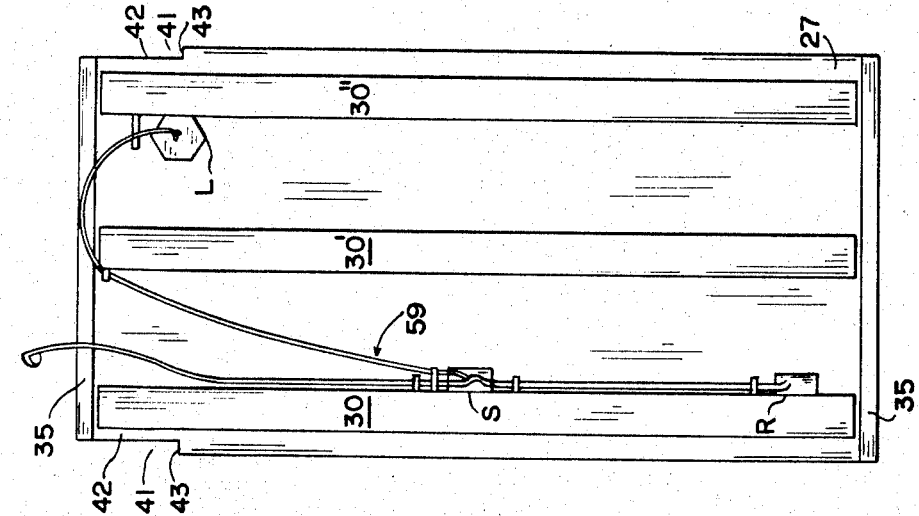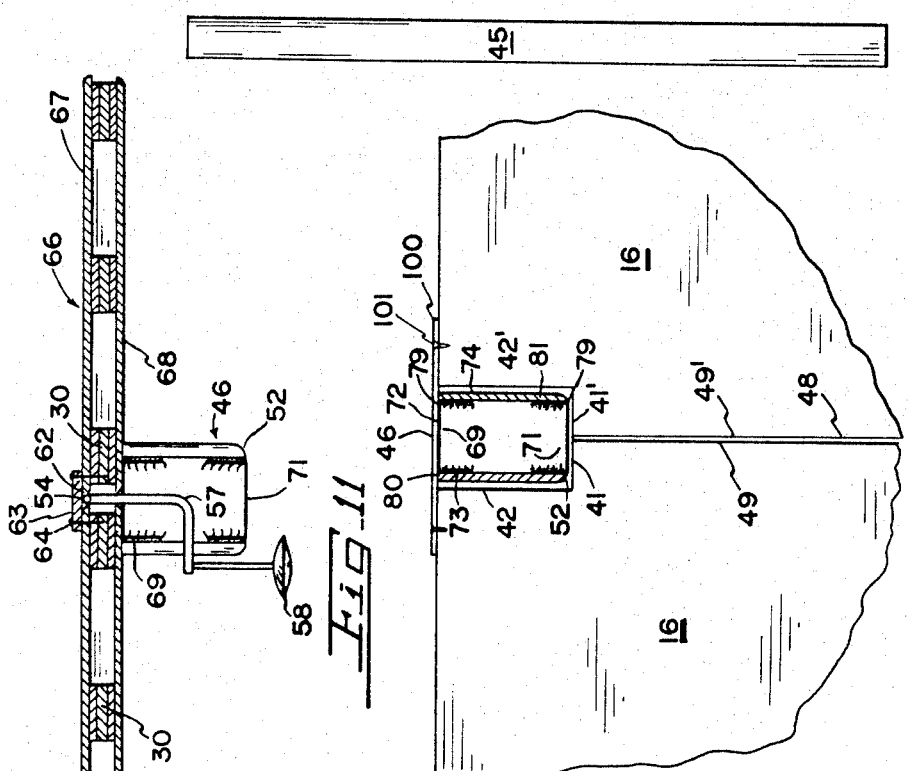

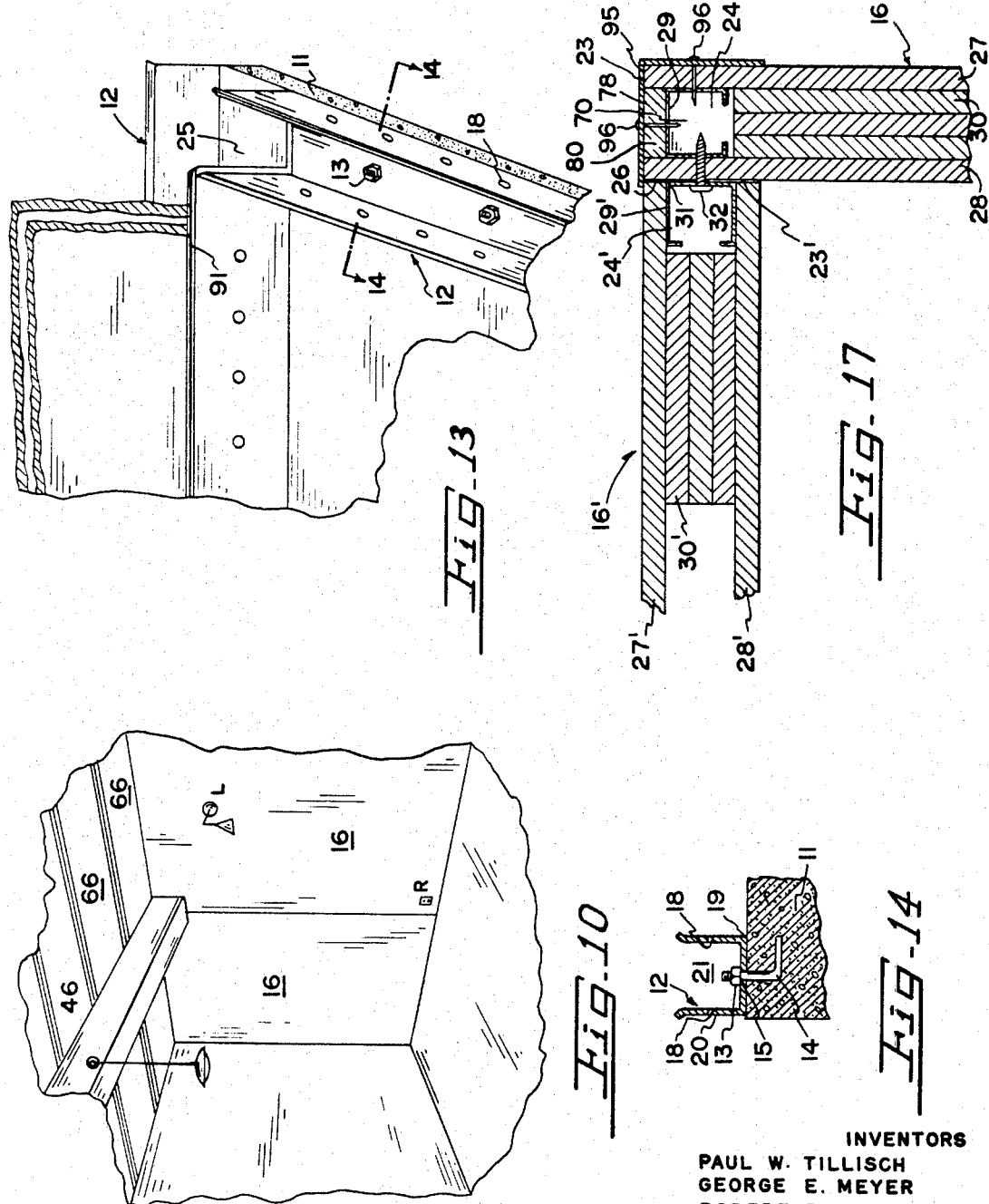

3,415,026
BUILDING OF GYPSUM STRUCTURAL
WALL ELEMENTS
Paul W. Tillisch, George E. Meyer, Robert R. Chiffoleau, and Rocco Papalia, Antioch, Calif., assignors to Kaiser Gypsum Company, Inc., Oakland, Calif., a corporation of Washington
Filed Oct. 23, 1965, Ser. No. 503,057
8 Claims. (Cl. 52—262)

ABSTRACT OF THE DISCLOSURE

In a substantially incombustible, weather-resistant building structure of lightweight loadbearing materials, assembled wall panels of spaced-apart, paper-covered, gypsum-core skin boards so designed that when assembled there is formed a beam-receiving slot, a spline disposed within a vertical slot at each edge and across the joint between adjacent panels and adhesively affixed to the inner surface of each of the skin boards, a beam disposed within the slot, such beam being of a particular hollow, lightweight construction and providing electrical raceways and the like. In another particular feature, the structure includes a combination comprising a board, adhesive and a metal member, adjacent one board face, having openings to receive adhesive and accelerate set thereof.

This invention relates to a substantially incombustible, weather-resistant building structure, and more particularly it relates to such a structure which is of light weight and is easily constructed.

It is among the objects of the present invention to provide a building construction which is reasonably weather-resistant, particularly in the more arid regions of the world, such as deserts and the like; which can be readily constructed at low cost and with a minimum of labor expenses; and in which many preformed elements are employed. It is a particular object of this invention to provide such a house the outer shell of which is constructed of exterior composite panels of which the weather-exposed faces are preferably gypsum-core sheathing boards and the interior are paper-lined gypsum boards; in which the interior partitions, at least such as are parallel with one or a long axis of the structure, are load-bearing, paper-covered, gypsum-core board assemblies; the roof beams are of semi-monocoque construction including a pair of paper-covered, gypsum-core boards; and in which the ceiling panels are double panels of paper-covered, gypsum-core board and are protected exteriorly by tar paper and gravel or other desired weather-resistant covering or coating. In a dwelling of the construction according to this invention, all plumbing and heating connections are preferably at one end wall of the structure, including the kitchen and bathroom assemblies.

The objects, elements and advantages of the present structure are illustrated in the accompanying drawings in which:

FIGURE 1 is a perspective view of a dwelling house according to the present invention, with the roof partly cut away to show beam emplacement;

FIGURE 2 is a plan view of the dwelling of FIGURE 1, taken on line 2—2, also showing placement of bath and kitchen fixtures in a schematic manner;

FIGURE 3 is an end view of one embodiment of a ceiling beam;

FIGURE 4 is a partial end view of another embodiment of a ceiling beam;

FIGURE 5 is a partially cut-away view of a box beam made according to the embodiment of FIGURE 4;

FIGURE 6 is a top plan view of a wall panel joint structure, without a top runner or channel;

FIGURE 7 is a front elevation view of a wall panel with one facing board omitted;

FIGURE 8 is a front elevation view of a spline for joining adjacent or contiguous wall panels;

FIGURE 9 is a front elevation view of a wall joint structure bearing a ceiling beam;

FIGURE 10 is a perspective view showing a ceiling beam, wall and ceiling panel assembly;

FIGURE 11 is a cross-sectional view of an assembly of ceiling or roof panels and a ceiling beam, the supporting walls being omitted for clarity;

FIGURE 12 is a top plan view of a suitable concrete or cement slab base for a dwelling as defined herein;

FIGURE 13 is a perspective view of one embodiment of wall-emplacement means and attachment thereof to a cement or concrete base;

FIGURE 14 is a sectional view on line 14, 14 of FIGURE 13;

FIGURE 15 is an elevational view of a window-bearing panel with the interior skin wallboard removed.

FIGURE 16 is an elevational view of a door-receiving panel with the interior skin wallboard removed;

FIGURE 17 is a sectional view of one corner embodiment, taken on line 17—17 of FIGURE 1;

FIGURE 18 is a fragmentary sectional view of a typical interior partition attachment according to one embodiment of this invention;

FIGURE 19 is an elevational view showing the strap to assist in holding the ceiling beam in place;

FIGURE 20 is an elevational view showing placement of an acoustical plank in a ceiling.

In the drawings like parts are generally designated by the same numerals and 10 is one embodiment of a dwelling house or structure according to the present invention having a concrete slab base 11, to which are attached sills or base runners 12. In the embodiment more particularly described herein runners 12 are metal channels each having a web 21, exterior or outer flange 20 and inner flange 22 and they are affixed by nuts 13 to bolts 14 which are suitably embedded at desired intervals in slab 11, for instance as shown in more detail in FIGURE 14 and pass through apertures 15 in web 21 of sill plate or runner 12. Preferably also a layer of water-resistant adhesive 19 is disposed between web 21 and concrete slab 11 to prevent any seepage of water into the house during rains or the like.

The bases of a plurality of load-bearing exterior wall panels 16 are disposed within channels 12 and are affixed thereto suitably by screws 17 which pass through apertures 18 in outer flange 20 of channel 12. Additionally, adhesive can be placed between the interior surface of web 21 and the bottom surface of panel 16, whereby the panel slides into place easily and is still more firmly fixed in place.

The house 10 is rectangular in outline and where the exterior walls meet at the four corners, the interior flange 22 of sill plate 12 is suitably cut away as at 25 (FIGURE 13) to enable one exterior panel, e.g. 16 in FIGURE 17 to extend over the end 26 of abutting panel 16′. An exterior panel 16 is a composite panel comprising two face or skin gypsum-core, paper-covered wallboards of known type 27 and 28, spaced apart by ribs extending over a major portion of the length of the boards. Each panel preferably comprises three such spacing ribs, e.g. 30, 30′, 30″, for best results and each rib comprises a plurality, preferably three of long, narrow strips of paper-covered, gypsum-core board, 33, secured together by layers of adhesive 34 at abutting longitudinal faces to form a unitary rib suitably of rectangular cross-section. One such rib 30, 30" is disposed near to but spaced from the long edges of each of the two facing panels, and one such rib 30' is located at substantially the longitudinal center line thereof. The ribs may be of the same or different widths. In a preferred embodiment, a laminated gypsum board strip member 35 of the same width as the ribs 30 is placed at the top and bottom of each panel, extending across the entire width thereof in a direction perpendicular to the length of the panel, reinforcing it and forming a substantially enclosed interior. Alternatively, member 35 can be of wood or it can be a metal channel. Due to the placement of ribs 30, 30', 30", hollow spaces 37 are formed in the assembled panel 16 and in a preferred structure an insulating blanket 38 of mineral wool, glass fibers or the like is placed in and fills such space. In constructing panel 16, skin boards 27 and 28 are adhesively attached to ribs 30, etc., e.g. at 39.

Each wallboard is recessed at the top at each side to provide a space 41, formed by a vertical face 42 and shoulder 43, whereby when two contiguous panels 16, 16' are assembled in coplanar relationship adjacent shoulders 41, 41' coact with each other and a spline 45 to support ceiling beam 46. In assembling panels 16 to form a wall, two such panels have adjacent longitudinal edge recesses 44 because of the spacing of ribs 30 as described above and these form a common recess to receive a joining member. A spline 45 bearing adhesive 47 on each longitudinal face is disposed within such common recess, extending through spaces 44 and across the juncture 48, e.g. between edges 49, 49' of panels 16, 16'. The top 51 of spline 45 is coplanar with shoulders 41, 41' of panels 16, 16' to provide a support for beam 46. Spline 45 extends a major portion of the length of boards 27, 28 and is affixed to the interior face of each by adhesive 47, but can terminate above the base of the boards. The loading sustained by spline 45 is transmitted to boards 27, 28 and the latter are the load-bearing elements. In the drawings, spline 45 as illustrated comprises a plurality of adhesively attached strips of paper-covered, gypsum-core board of known type, but alternatively spline 45 can be a wood strip of proper dimensions or can be of other desired material. For greatest fire resistance it is of the gypsum structure shown in the figures or of metal. The spline can be affixed to the boards by means of screws in addition to adhesive affixation. The adhesive joint provides racking strength, enables transfer of loading from beam to panels, and fills any gaps between adjacent surfaces.

Interior wallboard 28 of panel 16 and also of the ceiling beams and panels to be later described is of the usual paper-covered, gypsum-core construction well known to the art and it can be finished with a square edge or with a tapered edge or a beveled edge as shown at 52, for a more decorative finish. The exterior board 27 of the exterior wall panel or of the ceiling panel is of moisture-resistant construction and the core or paper or preferably both are of moisture-resistant composition. For instance, the core, made water-repellent according to Riddell and Kirk, U.S. Patent No. 2,597,901, 2,604,411 or 2,610,130 or in another desired manner; and the paper covering can be treated by the method of Riddell and Kirk, U.S. Patent No. 2,776,234, or in another desired manner. The core is preferably light weight composition as is known to the art. In a side wall, interior joint or juncture 48 can be filled in with joint cement if of tapered configuration and taped in the known manner, if desired. Exterior wall joint 48' is preferably in some instances filled with an elastic water-resistant joint cement and then taped in the known manner to allow for expansion and contraction under known weather conditions. However, in other instances a beveled edge-joint structure serves as a receptacle in which to place electrical wiring or plastic-coated conductor. Alternatively the electrical conductor or the like can be laid on the roof, if desired. Suitably, for a pleasing design, a wooden batten 53 is nailed or otherwise affixed over the joint in a side wall.

In ceiling construction, panels 66 are of similar construction to the wall panels 16 described above. Preferably, the interior and exterior skin boards 67 and 66, respectively, of the ceiling panel are both of beveled edge construction which gives a pleasing design finish to the lower or interior ceiling surface and which provides exteriorly a receptacle or passageway for electrical conductor 54 entering from power source 55. At suitable intervals a lead 57 is brought down from conductor 54 through box beam 46 and outwardly therefrom to a lighting fixture 58 or the like; or down through composite panel 16 to connect with a pre-wired system 59 including switch box S, receptacle box R and lamp wall connection L. The boxes and connections are adhesively attached to the interior face of one wall panel. If desired, they can be attached to wood or steel plates within the panel (not shown). All gypsum-core surfaces to which elements or accessories are adhesively attached are paper-covered, preferably of high strength paper available in commerce for lining such gypsum core boards. Such paper is strongly bonded to the gypsum core in the process of making the board, as is well known to those skilled in the gypsum board art. Other conduits (not shown) bring electrical current to operate the stove 61 in the kitchen. If desired, heat-insulation material, e.g. glass fiber strips, (not shown) are placed in the roof beveled passageways 62. In a preferred construction, a strip 63 of any desired metal, e.g. steel or aluminum, is placed over conductor 54 and nailed at 64 or otherwise affixed to the joint to prevent damage or shorting by later nailing of roofing material, walking or other damaging influence. In an arid climate the ceiling-roof construction just described suffices but it is generally advantageous to provide a tar paper-and-gravel protective coating 65 or another protective coating thereover in the known way.

The ceiling or roof panel 66 rests on and is supported by box beam 46. This beam comprises a top member, or chord, 69 and a bottom member or, chord 71 and a paper-covered, gypsum-core board element attached to the outer side surface of each such chord, thereby forming the side walls of the beam. The lower edge of such board element can be flat as at 76 but preferably it is beveled as at 52 for a more pleasing intreior finish. FIGURE 3 shows one embodiment wherein the chords 69' and 71' are of wood. However, this invention will be described with respect to the use of metal channels as chords 69 and 71, and more particularly such channels as are proviedd in the flanges thereof and, if desired, in the webs, with funnel-like depressions 82 in the metal surface which extend into the interior of the channel and are provided with an aperture at the base of each for a special purpose as will be later described. Each channel comprises a web 72 and side arms or flanges 73 and 74. Each flange preferably has a stiffening turn-over flange 75. An adhesive layer 79 is disposed between the exterior surfaces of flanges 73 and 74 and board elements 80 and 81, respectively. The adhesive flows inwardly through the apertures at the base of funnel-like depressions 82 and some of it enters space 83 interiorly of the channel. The adhesive sets very rapidly and provides a quick, strong bonding of the board to the channel and it is believed that this effect is caused by the partial exudation into space 83 whereby vaporization of the solvent of the adhesive is accelerated and a stronger bond is effected because of the keying of the adhesive by penetration and setting thereof through the apertures in depressions 82. If desired a number of screws can also be used to affix the boards to the channel. Alternatively, also, score marks 84 can be provided in web 72 of channel 69 to enable later nailing or screwing of the ceiling panels to such web. Where a wooden chord is employed board elements 80, 81 can be affixed thereto adhesively and in addition, if desired, can be nailed or screwed. Board elements 80, 81 can be of any thickness but are preferably at least ⅜ inch thick. The depth of the beam varies with the span and can be in many dwellings, for instance, from 6 inches to 16 inches. The chord member can similarly vary from 1.5 in. to 4 in. deep, i.e in vertical dimension when installed as shown. When the beam is in place in space 41 between panels 16, 16 and rests on shoulders 43, either in an exterior wall or in a similarly constructed interior wall, in one preferred embodiment a metal strap 100 is placed over the top of the beam and extends over the top of cross-rib 35 and is screwed to the latter as at 101, to assist in holding the beam in place and to resist any upward movement thereof. As shown in FIGURE 11, the beam assembly can also serve to carry an electrical conductor.

Windows and doors are disposed within individual panel assemblies. In one such arrangement, two horizontal metal stud members 85 and 85′, suitably spaced from each other are adhesively affixed and screwed to the interior face or surface of a board 27, and a pair of spaced-apart vertical metal stud members 86, 86′ are also thus affixed to the same panel. The stud members can also be affixed to panel 27 by means of screws alone (not shown) and can be of wood, if desired. Reinforcing ribs 30, etc. are cut away to accommodate the frame members and window and after the studs have been installed, the second skin panel is set over ribs 30 and affixed thereto. The window opening is framed by the combination of vertical and horizontal studs and any type of window can be later installed when the structure is assembled. In a door panel vertical, spaced-apart metal stud members 88 and horizontal metal stud member 89 are affixed, suitably by means of a layer of adhesive and screws, to panel 27, such affixed frame members defining a rectangular opening 90 in which a pre-hung door is placed upon assembly and fixed in place in the known way. There is also affixed to the base of studs 88 door sill plate 92.

In FIGURE 17 there is shown the detail of construction of a corner where the load-bearing exterior walls meet at a right angle. Panels 16 and 16′ comprise exterior sheathing, preferably water-resistant board 27, 27′, and interior board 28, 28′ spaced apart by ribs 30, 30′ all as previously described. Ribs 30 are spaced inwardly from the vertical edges 23, 23′ of panels 16, 16′ respectively and in spaces 24, 24′ formed thereby are placed vertical metal channels 29, 29′. The end 26 of panel 16′ and the web of channel 29′ abut the face of board 28 and are affixed thereto by a layer of adhesive 31 and screws 32 which penetrate through board 28 and the flange of channel 29, channels 29 and 29′ being placed at right angles to each other. Channels 29 and 29′ are also attached by screws (not shown) to the abutting boards 27, 28 and 27′, 28′, respectively. A gypsum filler block 70 is placed within space 24 to cover the web of channel 29, its outer face 78 being coplanar with vertical edge 23 of panel 16. Metal cover or finish L-plate 98, preferably of steel or aluminum, is placed over and nailed as at 99 or screwed to the corner strucutre as a design finish and also to protect the structure from water, rains, etc. In addition, it is advantageous, FIGURE 13, to caulk the top of sill plate 12 after emplacement of a panel 16 therein, as at 91.

FIGURE 18 is a horizontal, sectional view of one embodiment of an interior partition construction wherein an interior partition wall 97 comprises a panel of two skin boards 28, each being a paper-lined, gypsum-core board, these boards being spaced apart by ribs 30 of which only one is shown. Rib 30 is spaced inwardly from the edges 95 of boards 28 to form a recess 96 and a metal channel 29 is disposed therein, its web resting against the outer face of exterior panel 16 and being coplanar with edges 95 of boards 28 of partition 97. It will be understood that spaced boards 28 are assembled with ribs 30 into panels like 16 and as many such panels as desired are assembled into a partition in the usual manner.

Partition 97 is affixed to channel 29 by a layer of adhesive 99, and if desired by screws (not shown), and channel 29 is affixed to exterior panel 16 by screws 98, and if desired by adhesive (not shown).

FIGURE 19 illustrates one method and device for assisting in holding the ceiling beam in place and preventing it from being lifted out of position by windloading under the overhang or by other causes. In the embodiment shown a metal, preferably steel, bracket or right-angled member 104 is so disposde that one, or a vertical, arm thereof, 105, lies adjacent the outer face of panel 16, and the other or horizontal arm 106 lies adjacent the under surface of beam 46. The two arms 105 and 106 are affixed to such respective surfaces by screws 107.

FIGURE 20 illustrates one embodiment of an acoustical ceiling construction enabled by this invention wherein wooden runners or ledges 102 are adhesively attached as at 79 to the surfaces of neighboring beams 46 facing each other. An acoustical plank 103 is of any desired construction, e.g. of punched, fissured lignocellulose fiber board, the punched fissured surface thereof of course facing downwardly. Runners 102 can be made of other materials than wood, if desired, and they are spaced from the upper surfaces of beams 46. Thereby, when a panel or plank 103 has been installed, an air space is provided thereabove which affords insulation, or in which, if desired, an insulation batt or blanket (not shown) can be placed.

In the above-described dwelling, clothes rods, shelving and other accessories can be adhesively, by screws or otherwise applied to the interior walls. The plumbing appliances are placed against an exterior wall and necessary piping is then all exterior and is not shown herein. In placing electrical conduits or conductors within the rooms of the structure, or along exterior surfaces, it will be understood that separate exterior or exposed conduits can be employed. Suitably a plastic-coated conductor known as Romex wire is useful. It is an advantage of the present construction that the structure is substantially incombustible, particularly where metal studs, runners and like elements are employed.

If desired, for greater weather-resistance, expanded metal can be placed over the exterior wall surfaces and stucco applied thereafter, which provides water- or weather-resistance. It is advantageous otherwise to coat the exposed panel surfaces with a water-resistant paint to make these surfaces more weather-resistant. The end beam portion shown at 93 in FIGURE 1 is a dummy or stub beam attached to the exterior wall merely for a pleasing design. Metal caps 94 are U-shaped metal elements fitting over the exposed ends of the ceiling beams for protection against rain and the like. Calking is applied at the exterior, exposed joints; and interior joints are taped or spackled or otherwise treated, if desired. If desired, cover plates, for example of redwood planks or boards, can be applied over the sill or shoe plate or base plate and these can also be caulked. An asphalt adhesive is suitable for placement between the sill plate and the concrete slab.

The adhesive used for affixing splines to wallboards, boards to metal channels and at like combinations is suitably an organic adhesive, especially a rubbery water-resistant adhesive such as a polyvinyl acetate-base adhesive. However, other adhesives which act to bond the surfaces together as described herein are also useful. It is a great advantage of the present invention that there is provided a low cost, easily assembled structure which while economical to construct, withstands weather conditions well including wind and rain loading. The structure combines strength with light weight elements. It is a further advantage that the adhesive bonding of the various elements to each other has been found to provide high racking strength to resist windloads. Also, particularly in view of the adhesively affixed splined joints, the splines are lubricated by the adhesive for quick, easy insertion in place and the structure is well sealed for areas where dust and wind are a problem. Furthermore, the structure is highly fire-resistant, particularly where metal channels are employed as described hereinabove. The dwelling or structure of this invention is particularly useful in warm, arid regions.

While the invention has been described with reference to especially advantageous constructions or embodiments, it will be understood that changes and variations can be made therein without departing from the spirit and scope of the appended claims.

Having now described the invention, what is claimed is:

1. In a building construction the combination of a pair of panels comprising a pair of single paper-covered, gypsum-core facing boards spaced apart by a plurality of vertical paper-covered, gypsum-core ribs, said panels being in coplanar relationship and each having a pair of opposed vertical edges and having a recess at the upper side portion whereby when assembled said recesses adjoin to form a common beam-receiving slot having two sides and a base, each said panel having a vertical slot extending within each said vertical edge to form a common spline-receiving passage when assembled, a spline disposed within said passage and extending across the joint between said panels and adhesively affixed to the inner surface of each of said facing boards and having an upper end, said upper end being coplanar with the base of said beam-receiving slot, a beam disposed within said slot, said beam comprising a pair of vertically spaced-apart chords each having two elongated side faces and a hollow paper-covered, gypsum-core board element adhesively affixed to each pair of said faces of said chords, and a plurality of ceiling panels disposed upon and supported by said beam.

2. A hollow load-bearing beam for installation in the ceiling of a dwelling comprising a top chord, a bottom chord vertically spaced therefrom and a single paper-covered, gypsum-core board affixed to each outer vertical face of each said chord and disposed in a generally vertical plane to form a hollow beam member enclosed on four sides, each of said chords being a metal channel having disposed in the face abutting each said board a plurality of funnel-like openings inclined inwardly of the channel.

3. Beam as in claim 2 wherein there is disposed between each abutting chord face and panel an amount of adhesive sufficient to extend through said openings into the interior of each said metal channel to affix each said panel to said chord.

4. In a dry wall construction, a loadbearing combination including a pair of wall elements each having a vertical hollow edge portion, each of said elements comprising a pair of opposing spaced-apart paper-covered gypsum-core boards, a plurality of ribs formed of laminated paper-covered gypsum-core strips disposed between and affixed to each of said boards, each board having a recess at each top side portion whereby a beam-receiving recess having a bottom face is formed by two contiguous coplanar wall elements when assembled, and a spline disposed within said edge portion of one said element between said boards and extending into the edge portion of a contiguous, coplanar element when assembled, said spline being a paper-covered gypsum-core board and being adhesively affixed in face-to-face relationship to the interior face of each contiguous board of each wall element, the top of said spline being coplanar with the bottom face of said beam-receiving recess whereby said spline and said boards support said beam when assembled.

5. Construction as in claim 4 wherein said ribs are vertically disposed.

6. In a building structure loadbearing member, a combination comprising a paper-covered, gypsum-core board having two opposed faces, a hollow metal member disposed adjacent one face of said board, said metal member having in at least the surface thereof adjacent said face of said board a plurality of funnel-like depressions extending inwardly from said surface and having openings in communication with the interior of said hollow member, and rubbery, water-resistant adhesive disposed between said board face and said metal member surface and filling and extending through said openings partially into said interior.

7. Combination as in claim 6 wherein said metal member is a channel.

8. In a dry wall construction, a loadbearing combination including a pair of wall elements each having a vertical hollow edge portion, each of said elements comprising a pair of opposing spaced-apart paper-covered gypsum-core boards, a plurality of ribs formed of laminated paper-covered gypsum-core strips disposed between and affixed to each of said boards, each of said ribs extending over a major portion of the vertical length of each said board, each board having a recess at each top side portion whereby a beam-receiving recess having a bottom face is formed by two contiguous coplanar wall elements when assembled, and a spline disposed within said edge portion of one said element between said boards and extending into the edge portion of a contiguous, coplanar element when assembled to splice said pair of elements, said spline being a paper-covered gypsum-core board and being adhesively affixed in face-to-face relationship to the interior face of each contiguous board of each wall element, the top of said spline being coplanar with the bottom face of said beam-receiving recess whereby said spline and said boards support said beam when assembled and said spline transfers loading uniformly to each said board member.

References Cited

UNITED STATES PATENTS

| 1,075,845 | 10/1913 | Mills | 52—731 |
|---|---|---|---|
| 1,308,773 | 7/1919 | Clark | 52—255 |
| 1,372,206 | 3/1921 | Stadelman | 52—92 |
| 2,230,628 | 2/1941 | Sahlberg. | |
| 2,331,752 | 10/1943 | Wilson. | |
| 2,349,684 | 5/1944 | Stannard. | |
| 2,361,733 | 10/1944 | Bartholomew | 52—622 |
| 2,362,187 | 11/1944 | Brunton | 52—289 |
| 2,703,003 | 3/1955 | Ruppel | 52—602 |
| 3,236,014 | 2/1966 | Edgar | 52—270 |

FOREIGN PATENTS

| 29,837 | 1959 | Finland. |
|---|---|---|
| 1,287,947 | 1962 | France. |
| 581,411 | 1946 | Great Britain. |

OTHER REFERENCES

Harbor Plywood Catalog received 1945. U.S. Gypsum Co. Catalog dated November 1962.

JOHN E. MURTAGH, *Primary Examiner.*

U.S. Cl. X.R.

52—241, 285, 293, 586, 615, 731